United States Patent Office 2,980,704
Patented Apr. 18, 1961

2,980,704

NITRATE AND IODIDE ESTERS OF 5-NITRO-2-FURFURYL ALCOHOL AND PREPARATION OF THE IODIDE

Gabriel Gever, Oxford, N.Y., assignor to The Norwich Pharmacal Company, Norwich, N.Y., a corporation of New York No Drawing. Filed June 30, 1958, Ser. No. 745,247

2 Claims. (Cl. 260—346.1)

This invention relates to a pair of new chemical compounds which are valuable antiseptic and disinfecting agents, one of which is a superior intermediate for the production of the other. My new compounds are the nitrate and iodide esters of 5-nitro-2-furfuryl alcohol and may be represented by the formula:

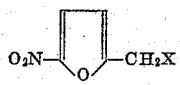

in which X represents a member of the group consisting of —I and —$ONO_2$ radicals.

I have discovered that each of my new compounds possesses an extremely broad antimicrobial spectrum. Each, in small amounts, is inimical to bacteria, fungi and protozoa. Their broad spectrum activity in low concentrations makes them valuable agents as disinfectants and in the preparation of compositions useful in the treatment of superficial infections. They are also valuable in imparting protection to organic material against attack by microorganisms.

The scope of activity of my new compounds is indicated in the following tables setting forth the results of tests to which they were respectively subjected in accordance with accepted procedures:

TABLE I
5-nitro-2-furfuryl nitrate

| Species | Minimum Inhibitory Concentration (mg. percent) |
|---|---|
| Staphylococcus aureus | 0.8–2 |
| Escherichia coli | 0.4–2 |
| Salmonella typhosa | 0.4–0.8 |
| Proteus vulgaris | 0.6–1.0 |
| S. choleraesuis | 0.4–0.8 |
| Brucella abortus | 0.8–3 |

TABLE II
5-nitro-2-furfuryl nitrate

| Species | Conc., mg. Percent | Zones of inhibition in mm. | | | | | | | |
|---|---|---|---|---|---|---|---|---|---|
| | | Agar | | | | Agar+Serum | | | |
| | | 2 Days | 4 Days | 6 Days | 8 Days | 2 Days | 4 Days | 6 Days | 8 Days |
| C. albicans | 31.8 | 70 | 62 | 60 | 55 | 39 | 39 | 36 | 27 |
|  | 3.18 | 17 | 9p | 0 | 0 | 15 | 9p | 0 | 0 |
| M. canis | 31.8 |  | C | C | C |  | 73 | 71 | 60 |
|  | 3.18 |  | 47 | 36 | 20p |  | 38 | 25 | 18p |
| T. mentagrophytes | 31.8 |  | C | C | C |  | 65 | 65 | 55 |
|  | 3.18 |  | 42 | 26 | 19 |  | 40 | 32 | 18 |
| E. floccosum | 31.8 |  |  | C | C |  |  | 70 | 65 |
|  | 3.18 |  |  | 47 | 31 |  |  | 32 | 16 |
| T. rubrum | 31.8 |  |  | C | C |  |  | 70 | 63 |
|  | 3.18 |  |  | C | 70 |  |  | 47 | 25 |
| T. violaceum | 31.8 |  |  | C | C |  |  | 70 | 61 |
|  | 3.18 |  |  | C | 65 |  |  | 31 | 21 |
| T. tonsurans | 31.8 |  |  |  | C |  |  |  | 0 |
|  | 3.18 |  |  |  | 31 |  |  |  | 41 |
| M. audouini | 31.8 |  |  |  | C |  |  |  | 0 |
|  | 3.18 |  |  |  | C |  |  |  | 27 |

C=complete inhibition.

When tested against *E. histolytica*, *T. vaginalis* and *T. foetus*, complete inhibition of growth was obtained by concentrations as low as about 1 part of 5-nitro-2-furfuryl nitrate to about 1.25 to $1.5 \times 10^5$ parts of medium.

TABLE III
5-nitro-2-furfuryl iodide

| Compound | Conc. in mg. Percent | Zones of inhibition in mm.—C. albicans | | | |
|---|---|---|---|---|---|
| | | 2 Days | 4 Days | 6 Days | 8 Days |
| 5-Nitro-2-furfuryl iodide | 5.1 | 25 | 17 | 17 | 17 |
|  | 2.0 | 18 | 12 | 12 | 12 |
|  | 1.0 | 12 | 10 | 9 | 9 |

TABLE IV
5-nitro-2-furfuryl iodide

| Compound | Conc. in mg. percent | Zones of inhibition in mm. (14 days) | |
|---|---|---|---|
| | | A. niger | Trich. sp. |
| 5-Nitro-2-furfuryl iodide | 25 | — | — |
|  | 10 | — | — |
|  | 1.25 | — | — |
| Control |  | + | + |

TABLE V
5-nitro-2-furfuryl iodide

| Compound | Conc. in mg. percent | Zones of inhibition in mm.—M. canis | | |
|---|---|---|---|---|
| | | 4 Days | 6 Days | 8 Days |
| 5-Nitro-2-furfuryl iodide | 20 | 50 | 44 | 34 |

When 5-nitro-2-furfuryl iodide was tested against *Candida albicans* at a concentration of 10 mg. percent complete sterilization of the medium was achieved in about 2–5 hours.

While my new compounds are both noteworthy for their broad spectrum of antimicrobial activity at small concentrations, they differ from each other in particulars that may be put to advantage in the case of a particular end use. For instance, when an aqueous solution for disinfectant and antiseptic use is desired, I prefer to use 5-nitro-2-furfuryl nitrate as its solubility in water is about 1500 mg./l. and aqueous solutions thereof can be prepared very easily. However, when it is desired to confer resistance to fungal attack upon an insulating coating for cables or wires which is composed of a vinyl plastic derived from vinyl chloride or vinyl esters, or a combination thereof, 5-nitro-2-furfuryl iodide is preferred as an effective quantity of that compound (about 0.4% by weight) does not impart an off color to the plastic, nor does it adversely affect its dielectric properties, and it is resistant to leaching.

My compounds may be readily formulated with available pharmaceutical excipients in the form of powders, solutions, suppositories, tinctures, jellies and the like. The following examples are given by way of illustration:

| | Parts |
|---|---|
| Suppository: | |
| Polyethylene glycol (mol. wt. 1000) | 84.0% |
| Polyoxyethylene palmitate | 15.9 |
| 5-nitro-2-furfuryl iodide | 0.1 |
| Powder: | |
| Talc | 50% |
| Cornstarch | 25 |
| Polyoxyethylene glycol (mol. wt. 6000) | 24.8 |
| 5-nitro-2-furfuryl iodide | 0.2 |
| Tincture: | |
| Ethyl alcohol | 50.00% |
| 5-nitro-2-furfuryl nitrate | 0.01 |
| Water, q.s. | 100.00 |
| Ointment: | |
| Carbowax 1540 | 50.0% |
| Carbowax 300 | 49.9 |
| 5-nitro-2-furfuryl nitrate | 0.1 |
| Suppository: | |
| Carbowax 1000 | 80.00% |
| Palmitic acid polyoxyethylene derivative containing 20 oxyethylene units per mol. | 19.95 |
| 5-nitro-2-furfuryl nitrate | 0.05 |
| Jelly: | |
| Methylcellulose | 3.0% |
| Glycerine | 10.0 |
| Water | 86.9 |
| 5-nitro-2-furfuryl nitrate | 0.1 |
| Solution: | |
| Propylene glycol | 20.00% |
| Water | 79.99 |
| 5-nitro-2-furfuryl nitrate | 0.01 |

The toxicity of members of my series is relatively low. In mice the $LD_{50}$ is about 650–670 mg./kg. Applied to the shaved skin and to the conjunctiva of rabbits as compositions in accordance with the aforesaid examples, no undue irritation or manifestation of toxicity has been noted.

My new compounds may be readily and economically prepared: 5-nitro-2-furfuryl nitrate can be prepared in high yield and pure form by nitrating the common, infinitely water-soluble form of furfuryl alcohol. In accordance with the practice of this invention, the alcohol is treated with a nitrating agent, such as one composed of acetic anhydride and nitric acid, at a temperature of about 0–50° C., the reaction mixture maintained at a temperature of about 30–50° C. for a brief time period, then cooled and neutralized.

I have further discovered that 5-nitro-2-furfuryl nitrate is an excellent intermediate for the preparation of 5-nitro-2-furfuryl iodide. In accordance with the practice of this invention, 5-nitro-2-furfuryl nitrate can be converted to the iodide in a very simple manner, as it is merely necessary to bring the nitrate and sodium iodide together in the presence of acetone whereupon they will react. The inorganic salt formed in the reaction precipitates and can be removed by filtration. The 5-nitro-2-furfuryl iodide is then recovered from the filtrate.

In order that my invention may be fully available to those skilled in the art, the following examples are given:

*Example I*

In a three liter, three-neck flask is placed 720 cc. of acetic anhydride. To this is added 189 gm. (2.1 mols) of nitric acid followed by 108 gm. (1.1 mols) of furfuryl alcohol, the temperature being held at 20°–25° C. by means of an ice bath. The total time of addition is about 12–15 minutes. The mixture is heated to 40° C. for one hour, cooled to 25° C. and 1000 cc. of water and 300 grams of trisodium phosphate added. The temperature is raised to 60° C. for one hour; cooled to 10–15° C. and the solid which separates is filtered. The yield of 5-nitro-2-furfuryl nitrate is 88 gms. (42%); M.P. 36.5° C.

| Analysis | C | H | N |
|---|---|---|---|
| Calc | 31.92 | 2.14 | 14.89 |
| Fd | 32.05 | 2.34 | 14.75 |

*Example II*

A solution of 300 g. (2 moles) of sodium iodide in one liter of acetone in a three-liter Erlenmeyer flask is treated with a solution of 375 g. (1.995 moles) of 5-nitro-2-furfuryl nitrate in 500 ml. acetone and cooled overnight in the refrigerator. The precipitated sodium nitrate is removed by filtration and is washed with 300 ml. acetone and dried to 163 g. (theory, 170 g.). The filtrate is combined with the acetone washings and diluted with ten liters of water. The separated oil crystallizes after the mixture is stirred for an hour. The yield of crude 5-nitro-2-furfuryl iodide after being air dried is 500 g. (theory 506 g.). The crude material is recrystallized from three liters of isopropyl alcohol and decolorized with charcoal. The product separates as an oil, which crystallizes when agitated. This is recrystallized from two liters of isopropyl alcohol. The hot solution is stirred vigorously for two hours, while being cooled with an ice bath. 326 g. of yellow crystals is recovered, M.P. 58° C., which is a yield of 65% of 5-nitro-2-furfuryl iodide.

What I claim is:
1. The chemical compound 5-nitro-2-furfuryl nitrate.
2. The process of preparing 5-nitro-2-furfuryl iodide which comprises causing 5-nitro-2-furfuryl nitrate to react with sodium iodide by bringing them together in the presence of acetone.

References Cited in the file of this patent

Gilman et al.: Iowa State College, J. Sci., vol. 6 (1932), pp. 389–91.